(12) United States Patent
Kim et al.

(10) Patent No.: US 10,530,007 B2
(45) Date of Patent: Jan. 7, 2020

(54) ELECTROLYTIC COPPER FOIL FOR LITHIUM SECONDARY BATTERY AND LITHIUM SECONDARY BATTERY COMPRISING THE SAME

(71) Applicant: LS Mtron Ltd., Anyang-si, Gyeonggi-do (KR)

(72) Inventors: Seung-Min Kim, Osan-si (KR); Soo-Yeol Kim, Jeongeup-si (KR); Dae-Young Kim, Yongin-si (KR); Jeong-Gil Lee, Seoul (KR)

(73) Assignee: KCF TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/315,765

(22) PCT Filed: May 11, 2016

(86) PCT No.: PCT/KR2016/004924
§ 371 (c)(1),
(2) Date: Dec. 2, 2016

(87) PCT Pub. No.: WO2016/208869
PCT Pub. Date: Dec. 29, 2016

(65) Prior Publication Data
US 2018/0212268 A1  Jul. 26, 2018

(30) Foreign Application Priority Data

Jun. 23, 2015 (KR) .................. 10-2015-0088927
Apr. 12, 2016 (KR) .................. 10-2016-0044805

(51) Int. Cl.
*H01M 10/052* (2010.01)
*H01M 4/66* (2006.01)
(Continued)

(52) U.S. Cl.
CPC ......... *H01M 10/052* (2013.01); *H01M 4/134* (2013.01); *H01M 4/66* (2013.01);
(Continued)

(58) Field of Classification Search
CPC ............... H01M 4/661; H01M 10/052; H01M 2004/027
See application file for complete search history.

(56) References Cited

U.S. PATENT DOCUMENTS 9,457,541 B2 * 10/2016 Kim .................. B32B 15/01
2010/0136434 A1 * 6/2010 Hanafusa .................. C22F 1/00
429/245

(Continued)

FOREIGN PATENT DOCUMENTS

CN  101669237 A  3/2010
EP  2660359 A1  11/2013
(Continued)

OTHER PUBLICATIONS

Decision to Grant a Patent. of JPO from Aug. 6, 2019 (Year: 2019).*
(Continued)

*Primary Examiner* — Alexander Usyatinsky
(74) *Attorney, Agent, or Firm* — K&L Gates LLP

(57) ABSTRACT

An electrolytic copper foil for a lithium secondary battery, which is applied as a negative electrode current collector of a lithium secondary battery, wherein when a correlation between a thermal treatment temperature of the electrolytic copper foil for a lithium secondary battery, which corresponds to a variable x, and an elongation increment ratio of the electrolytic copper foil for a lithium secondary battery, which corresponds to a variable y, is expressed as y=ax+b ($100 \leq x \leq 200$) on an x-y two-dimensional graph, the "a" value is in the range of 0.0009 to 0.0610.

5 Claims, 2 Drawing Sheets

(51) Int. Cl.
  *H01M 4/134* (2010.01)
  *H01M 10/0525* (2010.01)
  *H01M 4/02* (2006.01)

(52) U.S. Cl.
  CPC ....... *H01M 4/661* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2011/0223455 A1 | 9/2011 | Kimura et al. | |
| 2013/0115510 A1* | 5/2013 | Tani | H01M 4/0404 |
| | | | 429/199 |
| 2014/0291156 A1* | 10/2014 | Ezura | C25D 1/04 |
| | | | 205/50 |
| 2018/0102545 A1* | 4/2018 | Kim | H01M 4/661 |

FOREIGN PATENT DOCUMENTS

| | | | |
|---|---|---|---|
| JP | H11152593 | * | 6/1999 |
| JP | 2000182623 | * | 6/2000 |
| JP | 2000182623 A | | 6/2000 |
| JP | 2012022939 A | | 2/2012 |
| JP | 2013-095972 A2 | | 5/2013 |
| JP | 2013175488 | * | 9/2013 |
| JP | 2013175488 A | | 9/2013 |
| KR | 10-2014-0007507 A | | 1/2014 |
| KR | 10-2014-0084216 A | | 7/2014 |
| KR | 10-2015-0062227 A | | 6/2015 |
| TW | 201112480 A | | 4/2011 |
| WO | 2008/132987 A1 | | 11/2008 |
| WO | WO 2008132987 | * | 11/2008 |
| WO | 2013/065699 A1 | | 5/2013 |

OTHER PUBLICATIONS

Search Report for International Application No. PCT/KR2016/004924.
Written Opinion for International Application No. PCT/KR2016/004924.
Japanese Notice of Allowance for related Japanese Application No. 2017-565755; action dated Aug. 6, 2019; (2 pages).
Chinese Office Action for related Chinese Application No. 201680000864.0; action dated Aug. 5, 2019; (5 pages).
European Search Report for related European Application No. 16814582.9; action dated Nov. 8, 2018; (7 pages).

* cited by examiner

ELECTROLYTIC COPPER FOIL FOR LITHIUM SECONDARY BATTERY AND LITHIUM SECONDARY BATTERY COMPRISING THE SAME

CROSS-REFERENCE TO RELATED APPLICATIONS

The present application claims priority to Korean Patent Application No. 10-2015-0088927, filed Jun. 23, 2015, and Korean Patent Application No. 10-2016-0044805, filed Apr. 12, 2016, in the Republic of Korea, the disclosures of which are incorporated herein by reference.

BACKGROUND OF THE INVENTION

1. Filed of the Invention

The present disclosure relates to an electrolytic copper foil for a lithium secondary battery and a lithium secondary battery comprising the same, and more particularly, to an electrolytic copper foil for a lithium secondary battery and a lithium secondary battery comprising the same, which does not acquire wrinkles at an uncoated portion after coating during a battery manufacturing process, by adjusting an elongation increment ratio with respect to a thermal treatment temperature within a predetermined range.

2. Description of Related Art

A lithium secondary battery has many advantages such as relatively high energy density, high operation voltage, excellent preservation and long life span in comparison to other secondary batteries, and thus the lithium secondary battery is widely used for various portable electronic devices such as personal computers, camcorders, cellular phones, CD players, PDA or the like.

Generally, a lithium secondary battery includes a positive electrode and a negative electrode disposed with an electrolyte being interposed between them. Here, the positive electrode is configured so that a positive electrode active material is attached to a positive electrode current collector, and the negative electrode is configured so that a negative electrode active material is attached to a negative electrode current collector.

In the lithium secondary battery, the negative electrode current collector is generally made of an electrolytic copper foil, and the electrolytic copper foil should have excellent properties so that the performance of the secondary battery is maintained even though severe conditions are repeatedly formed in the secondary battery as the secondary battery is charged and discharged.

As a property required for the electrolytic copper foil, for example, the electrolytic copper foil should not be torn even though severe conditions are repeated due to charging and discharging.

Meanwhile, such excellent properties of the electrolytic copper foil may be ensured by adjusting various factors, but it is very difficult to find which factor should be adjusted and how much the factor should be adjusted in order to obtain desired properties.

SUMMARY

The present disclosure is designed according to the technical demand as described above, and the present disclosure is directed to providing an electrolytic copper foil for a lithium secondary battery, which may maintain excellent quality while the lithium secondary battery is being manufactured and used.

However, the technical objects to be accomplished by the present disclosure are not limited to the above, and other objects not mentioned above may be clearly understood from the following detailed description.

After the researches to accomplish the above object, the inventors of the present disclosure have found that an electrolytic copper foil and a secondary battery manufactured using the electrolytic copper foil as a current collector may ensure excellent quality when an elongation increment ratio with respect to a thermal treatment temperature is controlled within a certain range.

The electrolytic copper foil for a lithium secondary battery according to an embodiment of the present disclosure is applied as a negative electrode current collector of a lithium secondary battery, wherein when a correlation between a thermal treatment temperature of the electrolytic copper foil for a lithium secondary battery, which corresponds to a variable x, and an elongation increment ratio of the electrolytic copper foil for a lithium secondary battery, which corresponds to a variable y, is expressed as $y=ax+b$ ($100 \leq x \leq 200$) on an x-y two-dimensional graph, the "a" value is in the range of 0.0009 to 0.0610.

In addition, the electrolytic copper foil for a lithium secondary battery may have an elongation of 3% or above, when being measured after a thermal treatment is performed thereto at 100° C. for 30 minutes.

The electrolytic copper foil for a lithium secondary battery may have an anti-corrosion layer containing at least one of chrome (Cr), silane compound and nitride compound, on both surfaces thereof.

The electrolytic copper foil for a lithium secondary battery may have a thickness of 3 μm to 30 μm.

Both surfaces of the electrolytic copper foil for a lithium secondary battery may have a surface roughness of 3.5 μm or less on the basis of Rz.

Meanwhile, a lithium secondary battery according to an embodiment of the present disclosure is manufactured by applying the electrolytic copper foil for a lithium secondary battery, described above, as a negative electrode current collector.

ADVANTAGEOUS EFFECTS

According to an embodiment of the present disclosure, it is possible to prevent a wrinkle from being generated at an electrolytic copper foil for a lithium secondary battery during a battery manufacturing process. In addition, when the electrolytic copper foil for a lithium secondary battery is applied as a negative electrode current collector, it is possible to prevent the lithium secondary battery from being torn due to the electrolytic copper foil during repeated charging/discharging processes.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DETAILED DESCRIPTION OF THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an electrolytic copper foil for a lithium secondary battery according to an embodiment of the present disclosure will be described with reference to FIG. 1.

Figure 1:
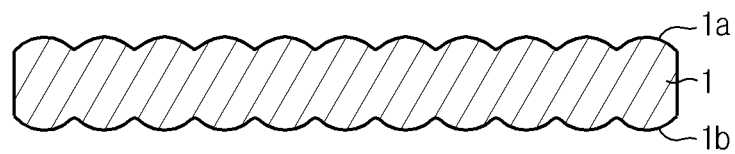
FIG. 1 is a cross-sectional view showing an electrolytic copper foil for a lithium secondary battery according to an embodiment of the present disclosure.

FIG. 1 is a cross-sectional view showing an electrolytic copper foil for a lithium secondary battery according to an embodiment of the present disclosure.

The electrolytic copper foil 1 for a lithium secondary battery according to an embodiment of the present disclosure, shown in FIG. 1, may be used as a negative electrode current collector of a lithium secondary battery. In other words, in the lithium secondary battery, the negative electrode current collector coupled to a negative electrode active material may employ the electrolytic copper foil.

Meanwhile, when manufacturing a lithium secondary battery, a positive electrode current collector coupled to a positive electrode active material generally employs a foil made of aluminum (Al).

Accordingly, the present disclosure is based on a case where the electrolytic copper foil 1 for a lithium secondary battery corresponds to a negative electrode current collector applied to the lithium secondary battery.

A thermal history applied to the electrolytic copper foil 1 for a lithium secondary battery during a lithium secondary battery manufacturing process is generally in the range of 100° C. to 200° C. In this process, an elongation of the copper foil should be maintained at a suitable level in order to prevent a wrinkle from being generated at an uncoated portion and also prevent the electrolytic copper foil from being torn during a charging or discharging process after the lithium secondary battery is manufactured.

In order to realize an accumulative thermal history for the electrolytic copper foil 1 for a lithium secondary battery, it is required to perform thermal treatments several times, desirably three times or more, at approximately regular temperature intervals within the temperature range of 100° C. to 200° C.

Figure 3:
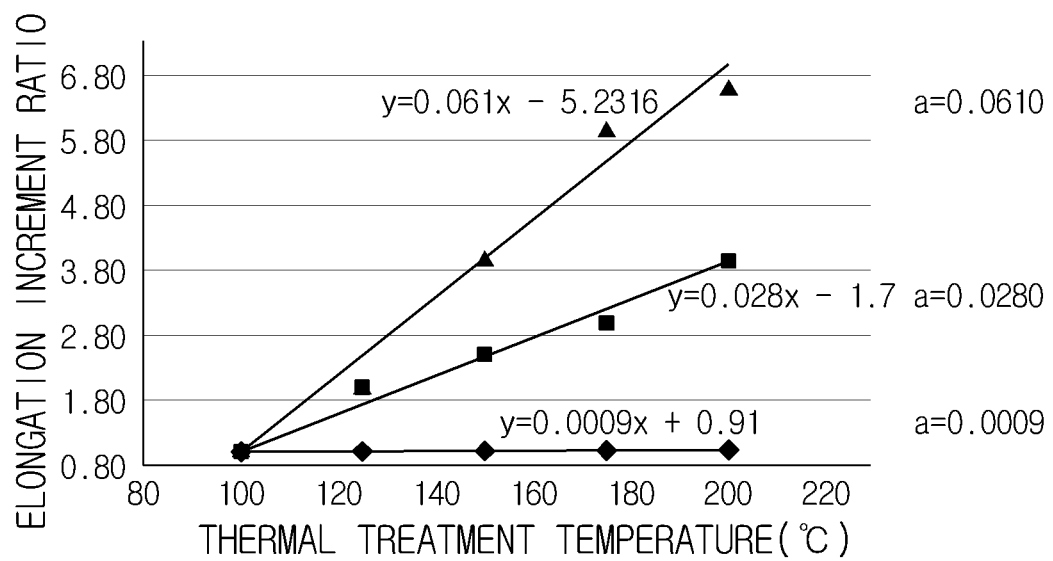
FIG. 3 is an x-y two-dimensional graph, obtained by setting a thermal treatment temperature with respect to the electrolytic copper foil for a lithium secondary battery according to an embodiment of the present disclosure as "x" and also setting an elongation increment ratio at a specific temperature as "y".
Figure 4:
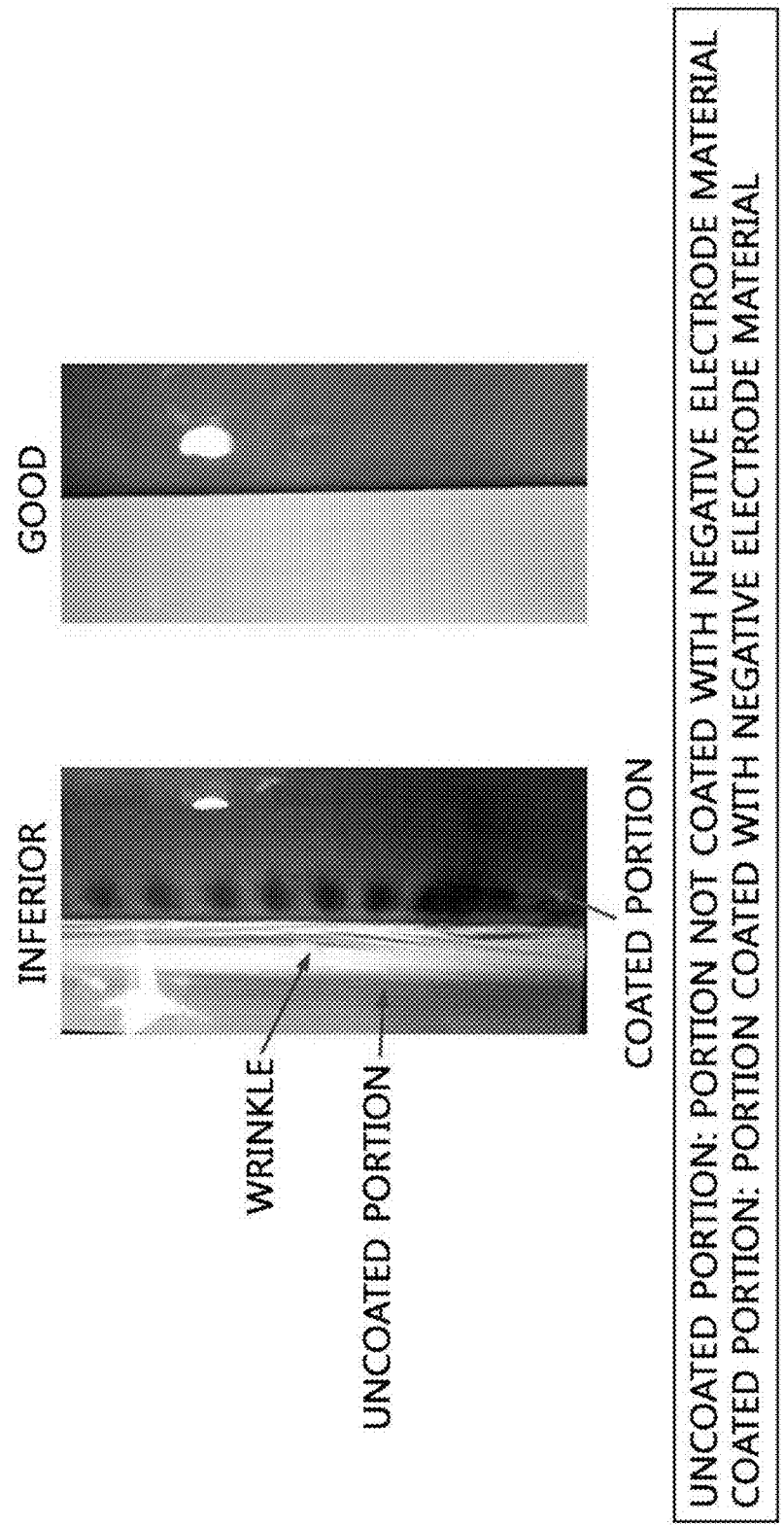
FIG. 4 is a photograph showing a case where a wrinkle is generated at the electrolytic copper foil for a lithium secondary battery during a battery manufacturing process and a case where no wrinkle is generated.

For example, referring to FIG. 3, in order to realize an accumulative thermal history for the electrolytic copper foil 1 for a lithium secondary battery, thermal treatments may be performed at about 100° C. for 30 minutes, at about 125° C. for 30 minutes, at about 150° C. for 30 minutes, at about 175° C. for 30 minutes and at about 200° C. for 30 minutes, with approximately 25° C. intervals.

In this case, by measuring an elongation of the electrolytic copper foil 1 for a lithium secondary battery, which has been thermally treated at each temperature, a two-dimensional graph representing a correlation between a thermal treatment temperature and an elongation increment ratio may be obtained.

In the present disclosure, the elongation increment ratio is defined as follows: [elongation increment ratio=elongation of the electrolytic copper foil, measured after being accumulatively thermally treated from an initial temperature 100° C. to a corresponding temperature/elongation of the electrolytic copper foil, measured after being thermally treated at the initial temperature 100° C. for 30 minutes].

Here, a 5-point thermal treatment is used as an example, but the number of accumulative thermal treatments for deriving a correlation between the thermal treatment temperature and the elongation increment ratio may be decreased or increased.

As described above, if a regression line is inserted into the thermal treatment temperature and the elongation increment ratio by using actually measured data, an equation y=ax+b expressed on an x-y two-dimensional graph may be obtained.

In the electrolytic copper foil 1 for a lithium secondary battery according to an embodiment of the present disclosure, the range of "a" may be maintained within the range of about 0.0009 to 0.0610.

In other words, if the value "a" is smaller than 0.0009, the electrolytic copper foil may be torn while the secondary battery is being charged or discharged. Also, if the value "a" is greater than 0.0610, a wrinkle may be formed at an uncoated portion of the electrolytic copper foil.

Therefore, if the electrolytic copper foil 1 for a lithium secondary battery maintains the value "a" within the above range, it is possible to prevent a wrinkle from being generated at the uncoated portion of the electrolytic copper foil while the lithium secondary battery is being manufactured, and or it is possible to prevent the electrolytic copper foil applied as a current collector from being torn while the manufactured lithium secondary battery is being repeatedly charged and discharged, thereby improving quality of the electrolytic copper foil and the lithium secondary battery.

In addition, the electrolytic copper foil 1 for a lithium secondary battery according to an embodiment of the present disclosure may be manufactured to have an elongation of about 3.0% or above, when being measured after a thermal treatment is performed thereto at 100° C. for 30 minutes.

If the above condition is not satisfied, the electrolytic copper foil may be torn while the lithium secondary battery is being manufactured.

Meanwhile, both surfaces of the electrolytic copper foil 1 for a lithium secondary battery according to an embodiment of the present disclosure may have surface roughness of about 0.2 μm to 3.5 μm, on the basis of Rz (ten-point average roughness).

If the surface roughness is less than about 0.2 μm, the adhesion between the electrolytic copper foil and the active material may deteriorate. If the adhesion between the electrolytic copper foil and the active material deteriorates as above, the active material is more likely to be separated while the lithium secondary battery is in use.

If the surface roughness is greater than about 3.5 μm, the active material may not be uniformly coated on a surface 1a of the electrolytic copper foil due to high roughness, thereby deteriorating an adhesion force. If the active material is not uniformly coated as above, the manufactured lithium secondary battery may have a deteriorated discharge capacity retention rate.

In addition, the electrolytic copper foil 1 for a lithium secondary battery may have a thickness of about 3 μm to 30 μm.

If the electrolytic copper foil has a thickness of less than about 3 μm which is too small, during a battery manufacturing process, the electrolytic copper foil may not be easily handled, thereby deteriorating workability. If the electrolytic copper foil has a thickness greater than about 30 μm, when the electrolytic copper foil is used as a current collector, the volume of the current collector may increase due to the thickness, which makes it difficult to manufacture a high-capacity battery.

Figure 2:
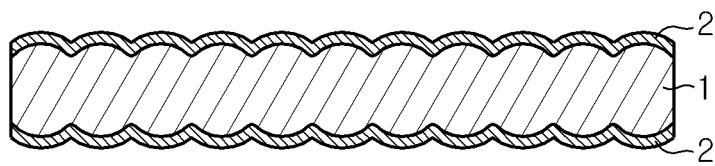
FIG. 2 is a cross-sectional view showing a coating layer formed at a surface of the electrolytic copper foil for a lithium secondary battery according to an embodiment of the present disclosure.

Meanwhile, referring to FIG. 2, the electrolytic copper foil 1 for a lithium secondary battery according to an embodiment of the present disclosure may further include an anti-corrosion layer 2 formed on the surface 1a thereof.

The anti-corrosion layer 2 is selectively formed on the surface 1a of the electrolytic copper foil for the corrosion control of the electrolytic copper foil 1 for a lithium secondary battery, and may contain at least one of chrome (Cr), silane compound and nitride compound.

The anti-corrosion layer 2 may also play a role of giving heat resistance and/or enhanced coupling with the active material to the electrolytic copper foil 1 for a lithium secondary battery, in addition to the corrosion control.

EXAMPLES AND COMPARATIVE EXAMPLES

Hereinafter, after preparing electrolytic copper foils according to examples satisfying features of the present disclosure as well as comparative examples, properties of the electrolytic copper foils according to the examples and the comparative examples are compared to investigate the features of the present disclosure more clearly.

An electrolytic copper foil for a lithium secondary battery according to each of the examples and the comparative examples is prepared using an apparatus for electrolytic deposition which includes a rotating drum and a positive electrode plate located at a predetermined interval from the drum, in an electrolytic bath. At this time, a distance between the positive electrode plate and the rotating drum may be adjusted within the range of about 5 to 20 mm, and a standard deviation of the distance should be controlled within 2 mm.

In a foil preparing process using such an apparatus for electrolytic deposition, copper sulphate may be used as an electrolyte. Also, gelatin, hydroxyethyl cellulose (HEC), sulfide-based compounds, and nitrides may be used as organic additives. Or else, an original foil may be produced during the foil preparing process without using the organic additives. In particular, during the manufacturing process, concentrations of TOC and Ag should be managed in order to obtain an electrolytic copper foil having properties desired in the present disclosure.

Regarding the composition of the electrolyte, the electrolytic copper foil for a lithium secondary battery according to an example of the present disclosure is prepared under the condition that a concentration of TOC in copper sulfate including 50 to 100 g/L of copper and 50 to 150 g/L of sulfuric acid is greater than 1 g/L or less, and/or a concentration of Ag is 0.5 g/L or less, and/or a current density applied for electrolytic deposition of the electrolytic copper foil is within the range of 30ASD to 80ASD, and/or a temperature of the electrolyte is in the range of 40° C. to 70° C.

Meanwhile, in order to prepare an electrolytic copper foil for a lithium secondary battery according to a comparative example, a method different from the above is applied. In detail, the electrolytic copper foil for a lithium secondary battery according to a comparative example may be prepared under the condition that a concentration of TOC in copper sulfate (50 to 100 g/L of copper and 50 to 150 g/L of sulfuric acid) used as an electrolyte during a foil preparing process, is greater than 1 g/L or above, and/or a concentration of Ag in the electrolyte is greater than 0.5 g/L, and/or a current density applied for electrolytic deposition of the electrolytic copper foil is out of the range of 30ASD to 80ASD.

Detailed electrolyte compositions and conditions to prepare an electrolytic copper foil according to each of the examples and the comparative examples are as follows.

Copper: 75 g/L
Sulfuric acid: 100 g/L
Temperature of electrolyte: 55° C.
Current density: see Table 1
TOC concentration in the electrolyte: see Table 1
Ag concentration in the electrolyte: see Table 1

TABLE 1

|  | TOC (g/L) | Ag (g/L) | current density (ASD) |
|---|---|---|---|
| Example 1 | 0.6 | 0.4 | 40 |
| Example 2 | 0.3 | 0.4 | 40 |
| Example 3 | 0.5 | 0.2 | 50 |
| Example 4 | 0.7 | 0.1 | 50 |
| Example 5 | 0.8 | 0.3 | 60 |
| Example 6 | 0.3 | 0.2 | 60 |
| Comparative Example 1 | 1.2 | 0.4 | 30 |
| Comparative Example 2 | 1.5 | 0.2 | 40 |
| Comparative Example 3 | 1.7 | 0.2 | 40 |
| Comparative Example 4 | 2 | 0.4 | 50 |
| Comparative Example 5 | 0.5 | 1 | 60 |
| Comparative Example 6 | 0.7 | 0.4 | 20 |
| Comparative Example 7 | 0.6 | 0.7 | 80 |

The different effects caused by properties of the electrolytic copper foil according to the range of a value "a" obtained due to accumulative thermal treatment with respect to the electrolytic copper foil according to each of the examples and the comparative examples as in Table 1 and the range of an elongation of the electrolytic copper foil after thermal treatment at 100° C. will be described with reference to Table 2.

Evaluation of performance of the electrolytic copper foil and the lithium secondary battery 2 parts by weight of styrene butadiene rubber (SBR) and 2 parts by weight of carboxymethyl cellulose (CMC) were mixed in 100 parts by weight of carbon, available in the market as a negative electrode active material, which was made into slurry by using distilled water as a solvent. The slurry was coated onto the electrolytic copper foil prepared according to each of the examples and the comparative examples and having a width of 20 cm as a negative electrode material and then dried, thereby preparing a cylindrical lithium secondary battery sample of 18650 standard.

During the battery manufacturing process as much as 300 m on the basis of the negative electrode material coating, if a wrinkle is generated in a region where the negative electrode material is not coated, it is determined that there is inferiority. In addition, after the cylindrical lithium secondary battery sample was prepared using the above process, a charging/discharging test was performed 200 times at 0.2C, and then the lithium secondary battery was dissembled. Here, it was checked whether the electrolytic copper foil coated with the negative electrode material is torn, and if the electrolytic copper foil was torn, the electrolytic copper foil was determined as having inferiority.

1) UTM measurement conditions:
Sample width: 12.7 mm
Distance between grips: 50 mm
Measurement speed: 50 mm/min
2) Sample and thermal treatment conditions:
Sample was cut into a width of 12.7 mm and then thermally treated.
Thermal treatment temperature range: 100° C. to 200° C.
Thermal treatment time: 30 minutes
Regression line calculating method: After a copper foil is thermally treated in the temperature range of 100° C. to 200° C. at 5 or more points at regular intervals, an elongation is measured. However, thermal treatment should be accumulatively performed so that a thermal history of the lithium secondary battery manufacturing process may be simulated during the thermal treatment.
5-point thermal treatment: An elongation is measured after a sample is thermally treated at 100° C. for 30 minutes, then an elongation is measured after the sample thermally treated at 100° C. for 30 minutes is thermally treated again at 125° C. for 30 minutes, then an elongation is measured after the sample thermally treated at 100° C. for 30 minutes and thermally treated at 125° C. for 30 minutes is thermally treated successively again at 150° C. for 30 minutes, and then an elongation is measured after the sample is additionally accumulatively thermally treated again at 175° C. and 200° C. From the elongation increment ratios measured at 5-point temperatures, the value "a" is obtained.
Graph: if a regression line is inserted into the thermal treatment temperature and the elongation increment ratio by using actually measured data, a graph expressed by an equation y=ax+b (x: thermal treatment temperature, y: elongation increment ratio, 100≤x≤200) may be obtained.
Elongation increment ratio: the elongation increment ratio is obtained by dividing an elongation, measured after thermal treatment in the range of 100° C. to 200° C., by an elongation, measured after thermal treatment at 100° C.

TABLE 2

| | a | elongation after thermal treatment at 100° C. for 30 minutes [%] | inferiority in a battery manufacturing process | tear of copper foil at charging/ discharging |
|---|---|---|---|---|
| Example 1 | 0.0009 | 3.2 | no wrinkle | not torn |
| Example 2 | 0.0280 | 3.2 | no wrinkle | not torn |
| Example 3 | 0.0610 | 3.1 | no wrinkle | not torn |
| Example 4 | 0.0009 | 8.9 | no wrinkle | not torn |
| Example 5 | 0.0280 | 9.4 | no wrinkle | not torn |
| Example 6 | 0.0610 | 9.1 | no wrinkle | not torn |
| Comparative Example 1 | 0.0009 | 2.9 | torn | not available |
| Comparative Example 2 | 0.0280 | 2.9 | torn | not available |
| Comparative Example 3 | 0.0610 | 2.8 | torn | not available |
| Comparative Example 4 | 0.0008 | 3.2 | no wrinkle | torn |
| Comparative Example 5 | 0.0620 | 9.3 | torn | not available |
| Comparative Example 6 | 0.0008 | 2.9 | torn | not available |
| Comparative Example 7 | 0.0620 | 2.9 | torn | not available |

If the Examples and Comparative Examples 4 and 6 in Table 2 are compared with each other, it may be understood that the electrolytic copper foil and/or the lithium secondary battery manufactured using the same may reliably maintain its quality only when the value "a" is 0.0009 or above.

Similarly, if the Examples and Comparative Examples 5 and 7 in Table 2 are compared with each other, it may be understood that the electrolytic copper foil and/or the lithium secondary battery manufactured using the same may reliably maintain its quality only when the value "a" is 0.0610 or less.

In addition, if Example 1 and Comparative Example 1, Example 2 and Comparative Example 2, and also Example 3 and Comparative Example 3 are respectively compared with each other, it may be understood that the electrolytic copper foil may reliably maintain its quality only when an elongation of the electrolytic copper foil is 3% or above, when being measured after performing a thermal treatment at 100° C. for 30 minutes.

Therefore, if the above results are synthetically put into consideration, it may be understood that an electrolytic copper foil and/or a lithium secondary battery manufactured using the same may maintain product reliability when the range of a value "a" measured from the electrolytic copper foil for a lithium secondary battery and the range of an elongation measured after a thermal treatment at about 100° C. for about 30 minutes satisfy the following ranges: about 0.0009≤a≤0.0610 and elongation ≥3.0%.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure provides an electrolytic copper foil for a lithium secondary battery, which is used for a negative electrode current collector applied to a lithium secondary battery, and a lithium secondary battery comprising the same.

What is claimed is:

1. An electrolytic copper foil for a lithium secondary battery, which is applied as a negative electrode current collector of the lithium secondary battery,
wherein when a correlation between a thermal treatment temperature (° C.) of the electrolytic copper foil, which corresponds to a variable x, and an elongation increment ratio of the electrolytic copper foil, which corresponds to a variable y, is expressed as y=ax+b (100° C.≤x≤200° C.) on an x-y two-dimensional graph, the "a" value is in the range of 0.0009 to 0.0610° $C.^{-1}$,
wherein the elongation increment ratio (y) is defined as follows:
the elongation increment ratio (y)=[elongation of the electrolytic copper foil measured after an accumulative thermal treatment from an initial temperature of 100° C. to the thermal treatment temperature (x)]/[elongation of the electrolytic copper foil measured after a thermal treatment at the initial temperature of 100° C. for 30 minutes],
wherein the correlation is obtained by performing a 5-point thermal treatment which is the accumulative thermal treatment during which the thermal treatment temperature (x) is increased from the initial temperature of 100° C. to 200° C. with an interval of 25° C. and thermal treatment at each thermal treatment temperature (x) is performed for 30 minutes, and
wherein the elongation of the electrolytic copper foil measured after the thermal treatment at the initial temperature of 100° C. for 30 minutes is 3% or above.

2. The electrolytic copper foil for the lithium secondary battery according to claim 1,
wherein the electrolytic copper foil for the lithium secondary battery has an anti-corrosion layer containing at least one of chrome (Cr), silane compound and nitride compound, on both surfaces thereof.

3. The electrolytic copper foil for the lithium secondary battery according to claim 1,
wherein the electrolytic copper foil for the lithium secondary battery has a thickness of 3 μm to 30 μm.

4. The electrolytic copper foil for the lithium secondary battery according to claim 1,
wherein both surfaces of the electrolytic copper foil for the lithium secondary battery have a surface roughness of 3.5 μm or less on the basis of Rz.

5. The lithium secondary battery, to which the electrolytic copper foil for the lithium secondary battery according to claim 1 is applied as a negative electrode current collector.

* * * * *